US012585011B2

(12) United States Patent
Chan et al.

(10) Patent No.: US 12,585,011 B2
(45) Date of Patent: Mar. 24, 2026

(54) RADAR DETECTION USING PRIOR TRACKED OBJECT INFORMATION

(71) Applicant: NXP B.V., Eindhoven (NL)

(72) Inventors: Lu Lu Chan, Veldhoven (NL);
Cornelis Gehrels, Nuenen (NL); Alp Sari, Eindhoven (NL); Takeshi Kaneko, Hertogenbosch (NL); Özgün Paker, Waalre (NL); Arie Geert Cornelis Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 18/365,350

(22) Filed: Aug. 4, 2023

(65) Prior Publication Data

US 2025/0044439 A1  Feb. 6, 2025

(51) Int. Cl.
*G01S 13/72* (2006.01)
*G01S 7/35* (2006.01)
*G01S 13/931* (2020.01)

(52) U.S. Cl.
CPC ............ *G01S 13/726* (2013.01); *G01S 7/356* (2021.05); *G01S 13/931* (2013.01)

(58) Field of Classification Search
CPC ....... G01S 13/726; G01S 7/356; G01S 13/931
USPC .......................................................... 342/70
See application file for complete search history.

(56) References Cited

U.S. PATENT DOCUMENTS

| | | | | | |
|---|---|---|---|---|---|
| 5,465,095 | A | * | 11/1995 | Bryant | ................ G01S 13/5244 342/162 |
| 9,470,777 | B2 | * | 10/2016 | Arage | ..................... G01S 13/42 |
| 9,983,294 | B2 | * | 5/2018 | Oshima | ................... G01S 13/58 |
| 10,054,680 | B2 | * | 8/2018 | Owirka | ............... G01S 13/5242 |
| 10,365,350 | B2 | * | 7/2019 | Kamo | ..................... G01S 7/417 |

(Continued)

FOREIGN PATENT DOCUMENTS

EP          1485730 B1  *  9/2005  ........... G01S 13/524

OTHER PUBLICATIONS

Romero et al., "Adaptive Beamsteering for Search-and-Track Application with Cognitive Radar Network," 2011 IEEE RadarCon (RADAR), May 23-27, 2011, 5 pages.

(Continued)

*Primary Examiner* — Nuzhat Pervin

(57) ABSTRACT

A system includes a processor and a non-transitory computer-readable medium storing machine instructions that cause the processor to perform a first fast Fourier transform (FFT) on received radar data to obtain a range-antenna data array and to perform a second FFT on the range-antenna data array to obtain a range-Doppler-antenna data cube. The processor performs peak detection on the range-Doppler-antenna data cube based on object information to obtain a subset that includes confirmed peaks and candidate peaks. The processor performs angle of arrival calculations for the subset of the range-Doppler-antenna data cube, and filters candidate peaks in the subset to obtain a point cloud representative of an environment. In some implementations, the confirmed peaks are detected based on a default threshold value, the candidate peaks are detected based on at least one adapted threshold value, and the at least one adapted threshold value is determined based on the object information.

20 Claims, 7 Drawing Sheets

● : POINT DETECTED WITH CONSTANT DETECTION THRESHOLD
✦ : POINT DETECTED WITH ADJUSTED DETECTION THRESHOLD
◯ : PRIOR TRACKED OBJECT INFORMATION

CONVENTIONAL POINT CLOUD WITH
CONSTANT DETECTION THRESHOLD

IMPROVED POINT CLOUD WITH
ADJUSTED DETECTION THRESHOLD

(56) References Cited

U.S. PATENT DOCUMENTS

| | | | | |
|---|---|---|---|---|
| 10,514,454 B1* | 12/2019 | Parrott | | G01F 1/663 |
| 10,748,856 B2* | 8/2020 | Moon | | H01L 23/5383 |
| 10,756,062 B2* | 8/2020 | Kim | | H01L 23/49816 |
| 10,962,637 B2* | 3/2021 | Bharadwaj, Jr | | G01S 7/4056 |
| 11,073,608 B2* | 7/2021 | Ng | | G01S 7/282 |
| 11,378,667 B2* | 7/2022 | Viswanatha | | G01S 7/493 |
| 11,454,702 B2* | 9/2022 | Krieger | | G01S 7/4034 |
| 11,662,455 B2* | 5/2023 | Bharadwaj | | G01S 13/583 |
| | | | | 342/128 |
| 11,728,274 B2* | 8/2023 | Kim | | H01L 25/50 |
| | | | | 257/774 |
| 11,796,628 B2* | 10/2023 | Nayyar | | G01S 13/42 |
| 11,885,903 B2* | 1/2024 | Meissner | | G01S 7/023 |
| 12,013,484 B2* | 6/2024 | Roger | | G01S 7/356 |
| 12,140,696 B2* | 11/2024 | Chen | | G01S 7/417 |
| 12,270,930 B1* | 4/2025 | Abatzoglou | | G01S 7/023 |
| 2008/0018523 A1* | 1/2008 | Kelly, Jr. | | G01S 7/354 |
| | | | | 342/21 |
| 2013/0342382 A1* | 12/2013 | Maeno | | G01S 13/5246 |
| | | | | 342/93 |
| 2015/0331098 A1* | 11/2015 | Luebbert | | G01S 7/354 |
| | | | | 342/91 |
| 2016/0245911 A1* | 8/2016 | Wang | | G01S 7/2927 |
| 2018/0172813 A1* | 6/2018 | Rao | | G01S 13/343 |
| 2018/0254923 A1* | 9/2018 | Dutz | | H04L 27/2662 |
| 2018/0321368 A1* | 11/2018 | Bharadwaj | | G01S 13/931 |
| 2018/0351250 A1* | 12/2018 | Achour | | H01Q 21/064 |
| 2019/0096866 A1* | 3/2019 | Hsu | | H01L 24/17 |
| 2019/0146081 A1* | 5/2019 | Bilik | | G01S 13/931 |
| | | | | 701/301 |
| 2019/0293749 A1* | 9/2019 | Itkin | | G01S 13/931 |
| 2020/0043186 A1* | 2/2020 | Selviah | | G06T 7/33 |
| 2020/0072941 A1* | 3/2020 | Jansen | | G01S 13/345 |
| 2020/0096626 A1* | 3/2020 | Wang | | G01S 13/4454 |
| 2020/0132811 A1* | 4/2020 | Goswami | | G01S 7/40 |
| 2020/0150260 A1* | 5/2020 | Lang | | G01S 13/42 |
| 2020/0309939 A1* | 10/2020 | Subburaj | | G01S 13/584 |
| 2020/0341134 A1* | 10/2020 | Roger | | G01S 7/352 |
| 2020/0363518 A1* | 11/2020 | Rao | | G01S 13/282 |
| 2021/0116541 A1* | 4/2021 | Schubert | | G01S 7/415 |
| 2021/0255279 A1* | 8/2021 | Goswami | | G01S 13/536 |
| 2021/0278501 A1* | 9/2021 | Sturm | | G01S 7/356 |
| 2021/0356562 A1* | 11/2021 | Liu | | G01S 17/42 |
| 2021/0364596 A1* | 11/2021 | Roger | | G01S 7/2883 |
| 2021/0364599 A1* | 11/2021 | Roger | | G01S 13/931 |
| 2021/0364622 A1* | 11/2021 | Roger | | G01S 13/584 |
| 2022/0120890 A1* | 4/2022 | Roger | | G01S 7/356 |
| 2022/0130801 A1* | 4/2022 | Lee | | H01L 25/50 |
| 2022/0139880 A1* | 5/2022 | Lee | | H01L 25/18 |
| | | | | 257/621 |
| 2022/0196798 A1* | 6/2022 | Chen | | G01S 7/354 |
| 2022/0242443 A1* | 8/2022 | Traa | | G01S 13/343 |
| 2022/0293580 A1* | 9/2022 | Park | | H01L 23/5226 |
| 2022/0342039 A1* | 10/2022 | Eschbaumer | | G01S 7/415 |
| 2022/0404458 A1* | 12/2022 | Ranney | | H04K 3/822 |
| 2023/0051791 A1* | 2/2023 | Sturm | | G01S 7/023 |
| 2023/0112006 A1* | 4/2023 | Oh | | H01L 24/09 |
| | | | | 257/777 |
| 2023/0133116 A1* | 5/2023 | Jang | | H01L 24/05 |
| | | | | 257/774 |
| 2023/0133322 A1* | 5/2023 | Kim | | H01L 24/48 |
| | | | | 257/737 |
| 2023/0138813 A1* | 5/2023 | Seo | | H01L 25/0657 |
| | | | | 257/774 |
| 2023/0161027 A1* | 5/2023 | Amihood | | G01S 7/023 |
| | | | | 342/109 |
| 2023/0411355 A1* | 12/2023 | Cho | | H01L 23/3107 |
| 2024/0038728 A1* | 2/2024 | Jang | | H01L 23/544 |
| 2024/0094376 A1* | 3/2024 | Bialer | | G01S 13/86 |
| 2024/0096815 A1* | 3/2024 | Jang | | H01L 25/105 |
| 2024/0194575 A1* | 6/2024 | Oh | | H01L 24/08 |
| 2024/0194624 A1* | 6/2024 | Kim | | H01L 23/481 |
| 2024/0248193 A1* | 7/2024 | Choi | | G01S 13/34 |
| 2024/0264271 A1* | 8/2024 | Heunisch | | G01S 7/41 |
| 2024/0310480 A1* | 9/2024 | Addison | | G01S 7/354 |
| 2024/0353529 A1* | 10/2024 | Wilkes | | G01S 13/343 |
| 2024/0385286 A1* | 11/2024 | Kazaz | | G01S 13/42 |
| 2024/0410978 A1* | 12/2024 | Liu | | G01S 13/42 |
| 2024/0427011 A1* | 12/2024 | Roger | | G01S 13/584 |

OTHER PUBLICATIONS

Aslan et al., "Optimal Tracker-Aware Radar Detector Threshold Adaptation: A Closed-Form Solution," 2008 11th International Conference on Information Fusion, Jun. 30, 2008-Jul. 3, 2008, 8 pages.

Rohling, Hermann, "Ordered Statistic CFAR Technique—an Overview," 2011 12th International Radar Symposium (IRS), Sep. 7-9, 2011, 8 pages.

* cited by examiner

500

510 — PREPROCESS THE OBJECT INFORMATION

520 — CONVERT OBJECT INFORMATION INTO RADAR COORDINATES (R, D, Θ)

530 — IDENTIFY INDICES (Ir, Id) OF RANGE-DOPPLER BINS CORRESPONDING TO THE RADAR COORDINATES (R, D, Θ)

540 — IDENTIFY REGIONS AROUND INDICES (Ir, Id) TO DETERMINE OBJECT AREAS

550 — CALCULATE AN ADAPTED DETECTION THRESHOLD

560 — FOR EACH RANGE-DOPPLER BIN IN THE OBJECT AREAS, DETERMINE AN OBJECT RESPONSIBILITY

570 — FOR EACH RANGE-DOPPLER BIN IN THE OBJECT AREAS, ADJUST A DEFAULT DETECTION THRESHOLD BASED ON THE CORRESPONDING OBJECT RESPONSIBILITY

580 — IDENTIFY CONFIRMED PEAKS AND CANDIDATE PEAKS IN THE RANGE-DOPPLER-ANTENNA DATA CUBE 425 USING THE ADAPTED DETECTION THRESHOLD

590 — INCLUDE THE CONFIRMED PEAKS AND THE CANDIDATE PEAKS IN THE SUBSET 435 OF RANGE-DOPPLER-ANTENNA DATA CUBE 425

FIG. 5

RADAR DETECTION USING PRIOR TRACKED OBJECT INFORMATION

BACKGROUND

Some radar systems are included in vehicles as part of automated driving assistance systems and used to assist in perception of environments around the vehicles. To accurately represent the environment, a radar system performs peak detection to identify objects. However, performing peak detection based on a constant detection threshold within each range bin can lead to false negative detections where a signal strength of radar reflections off an object is close to a noise floor.

BRIEF DESCRIPTION OF THE DRAWINGS

The present invention may be better understood, and its numerous objects, features, and advantages made apparent to those skilled in the art by referencing the accompanying drawings.

FIG. 5 shows, in flow chart form, an example process for performing peak detection using object information, according to one embodiment.

The use of the same reference symbols in different drawings indicates identical items unless otherwise noted. The Figures are not necessarily drawn to scale.

DETAILED DESCRIPTION

As discussed previously herein, some techniques for performing peak detection can lead to false negative detections where a signal strength of radar reflections off an object is close to a noise floor of the radar system. The disclosed techniques and radar systems implementing the disclosed techniques are able to adapt a detection threshold based on information about tracked objects to selectively reduce a detection threshold in regions in which an object is expected to be. Peaks detected by the lowered detection threshold are further processed, resulting in a lower probability of missed detections or false negative rate. Peaks detected by the lowered detection threshold can increase the density of detections over the object. In addition, the peaks detected by the lowered detection threshold are already associated with a tracked object and better able to represent extended objects.

Figure 1:
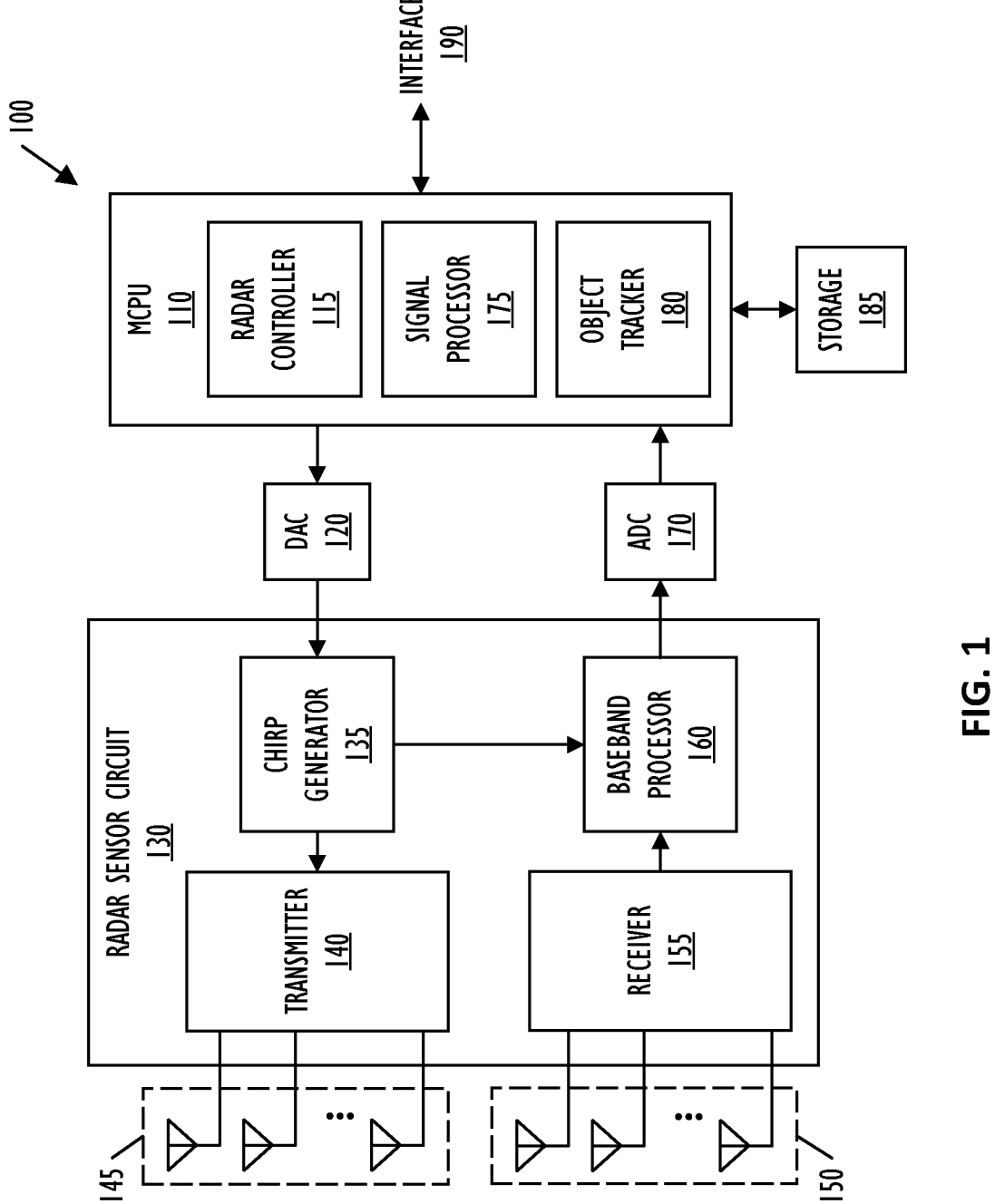
FIG. 1 shows, in block diagram form, an example radar system, according to one embodiment.

FIG. 1 shows, in block diagram form, an example radar system 100, according to an embodiment. Radar system 100 can be included in a vehicle, such as for an automotive driver assistance system. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. The term "angle of arrival" of an object is used herein to indicate the angle of arrival of a signal reflected off the object relative to the alignment of the radar system and usually includes azimuthal and elevation angles. Although radar system 100 is described herein as a linear chirp radar system, any appropriate radar system that generates range or Doppler information can be used.

In this example, radar system 100 includes a microcontroller and processor unit (MCPU) 110, a digital-to-analog converter (DAC) 120, a radar sensor circuit 130, a first antenna array 145, a second antenna array 150, an analog-to-digital converter (ADC) 170, and storage 180. The MCPU 110 comprises one or more MCPU cores, general purpose processing cores, array or vector processing cores, parallel processing cores, graphic processing units, neural net and linear algebra accelerators, field-programmable gate arrays, digital signal processors, application-specific integrated circuits, and the like, or any combination thereof. The term "MCPU" in the singular is used herein to refer to either a single or multiple of the MCPU cores, general purpose processing cores, array or vector processing cores, parallel processing cores, graphic processing units, digital signal processors, neural net and linear algebra accelerators, application-specific integrated circuits, field-programmable gate arrays, and the like, or any combination thereof comprised in the MCPU 110.

MCPU 110 includes a radar controller 115, a signal processor 175, and an object tracker 180. The radar controller 115 can receive data from the radar sensor circuit 130 and control radar parameters of the radar sensor circuit 130 such as frequency band, length of a radar frame, and the like via the DAC 120. A control signal from DAC 120 can be used to adjust the radar chirp signals output from a chirp generator 135 included in radar sensor circuit 130. The signal processor 175 in MCPU 110 can also receive the data from the radar sensor circuit 130 and perform signal processing for determining a distance or range between a target object and radar system 100, a radial velocity of the target object, an angle of arrival for the target object, and the like. The signal processor 175 can provide the calculated values to the storage 185 and/or to other systems via the interface 190.

The object tracker 180 can obtain object information from storage 185 or from other kinds of sensing systems via the interface 190. For example, the object tracker 180 can obtain object information from an imaging or stereo imaging system, a light detection and ranging (LIDAR) system, and the like, as well as combinations of sensing systems. In this implementation, the object tracker 180 is included in the MCPU 110, but in other implementations, the object tracker 180 can be included in a separate processing system and provide the object information to the signal processor 175 via the interface 190. The object information can include the number, if any, of objects in the environment; and the dynamic state of the objects in the environment, including at least one of the location, velocity, acceleration, turn rate, and the like of the objects in the environment in polar, Cartesian, or other coordinates. The object information can include information based on sensor data captured at a previous time, such as a radar frame prior to the current radar frame. In addition or alternatively, the object information can include information based on sensor data captured at a same time as the current radar frame. For example, a different sensing system such as a camera system and the radar system 100 capture data at approximately the same time. Object detection performed on the camera data is completed before object detection performed on the radar data is completed, such that the object information includes camera data captured at approximately the same time as the radar data.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems, such as a radar-camera-lidar fusion system; an automated driving assistance system including parking, braking, or lane-change assistance features; and the like. The storage 185 can be used to store instructions for the MCPU 110, received data from the radar sensor circuit 130, calculated values from the signal processor 175, and the like. Storage 185 can be any appropriate storage medium, such as a volatile or non-volatile memory.

The radar sensor circuit 130 includes the chirp generator 135, a transmitter 140, a receiver 155, and a baseband processor 160. The chirp generator 135 can include a local oscillator, for example, and generates radar chirp signals and provides them to the transmitter 140. For example, the chirp generator 135 frequency can modulate a continuous wave signal to form a series of linear chirp signals. The transmitted chirp signal of a known, stable frequency continuous wave varies up or down in frequency over a period of time by the modulated signal. The chirp generator 135 provides the generated chirp signals to the transmitter 140, which drives the first antenna array 145 of one or more transmitter (TX) antennas. The second antenna array 150 comprises one or more receiver (RX) antennas and receives signals reflected from objects in the path of the transmitted chirp signals from the TX antenna array 145. The TX antenna array 145 and the RX antenna array 150 can be stationary or configured to transmit and receive across a range of area, such as by mechanical movement.

The receiver 155 receives the reflected signals from the RX antenna array 150 and provides them to the baseband processor 160. The baseband processor 160 also receives the transmitted chirp signals from the chirp generator 135 and down-converts the received chirp signals directly into the baseband using the copy of the transmitted chirp signals from the chirp generator 135. The baseband processor 160 can then filter and amplify the baseband signal. The baseband processor 160 provides the filtered and amplified baseband signal to the ADC 170, which digitizes the signal and provides it to the MCPU 110. The signal processor 175 in the MCPU 110 can then perform time domain to frequency domain transforms such as fast Fourier transforms (FFTs) and other signal processing to determine the distance, radial velocity, and angle of arrival between the target object and the radar system 100.

Frequency differences between the received reflections and the transmitted chirp signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the absolute value of each range bin denoting the signal strength of reflected targets at the corresponding range. A further "Doppler" FFT is then performed for each range bin across all the chirps in a frame to estimate the velocities of reflected targets. Additional processing can then be performed to determine the angle of arrival between the targets and the radar system 100.

Although the radar system 100 is described herein as implementing FFT-based range-Doppler processing, any appropriate transforms may be used to produce the range-Doppler information. The radar system 100 can then output a point cloud that is representative of the environment around the radar system 100, and each point in the point cloud can include information indicative of the range between the radar system 100 and the point in the environment, the radial velocity of the point, the azimuth angle of the point relative to the radar system 100, the elevation angle of the point relative to the radar system 100, and any combination thereof.

For an implementation in which the radar system 100 is included in a vehicle with an automated driving assistance system, the automated driving assistance system can use the determined distance, velocity, and angle of arrival for objects in the field of view from the radar system 100 to provide parking, braking, or lane-change assistance. The radar system 100 must detect objects in the field of view of the radar system 100 and determine the corresponding distances, velocities, and/or angles of arrival. Radar systems according to the disclosed invention adjust object detection thresholds based on object information.

Figure 2:
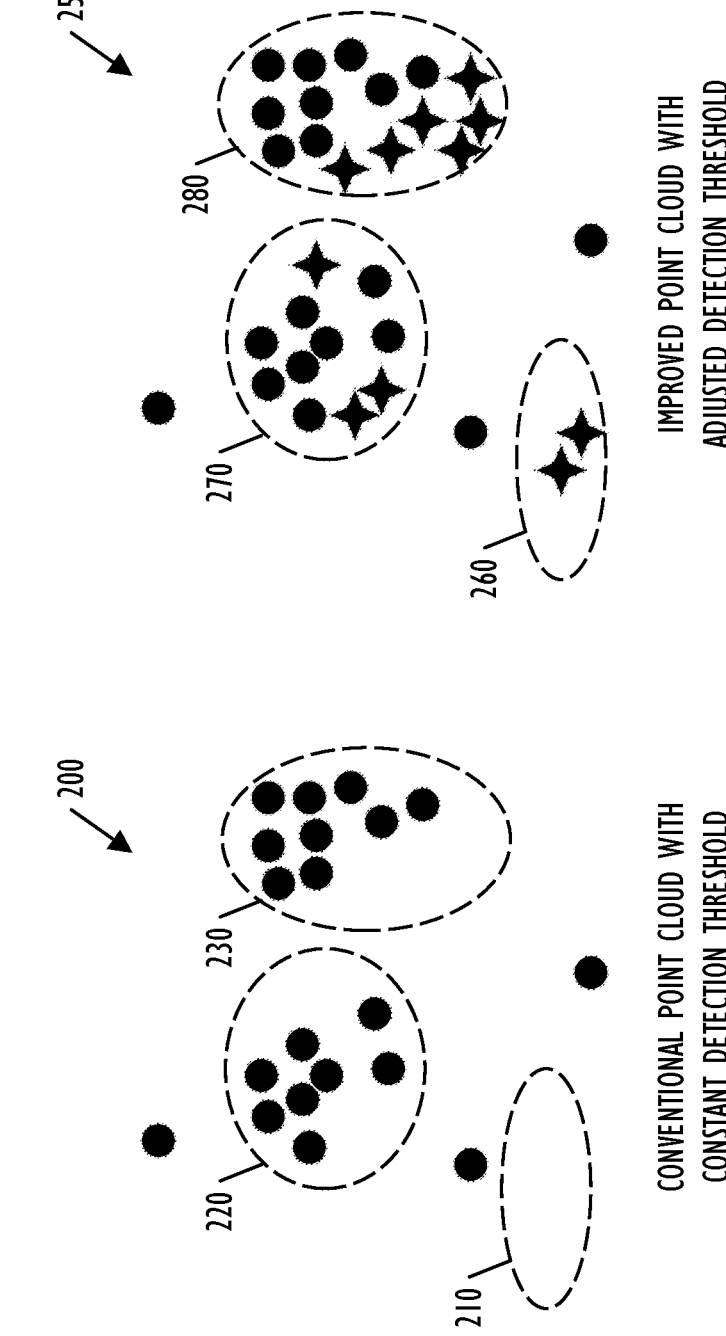
FIG. 2 shows diagrams of example point clouds generated using conventional techniques and disclosed techniques for adjusted detection thresholds, according to one embodiment.

FIG. 2 shows a diagram 200 of an example point cloud generated using conventional techniques and a diagram 250 of an example point cloud generated using disclosed techniques for adjusted detection thresholds, according to one embodiment. Diagram 200 includes points generated using conventional techniques and a constant detection threshold within each range bin, without reference to the object information indicated by regions 210, 220, and 230. For example, the regions 210, 220, and 230 can indicate areas of the point cloud in which objects were detected at an earlier time, such as the radar frame prior to the current radar frame. As another example, a different sensing system such as a camera system and the radar system capture data at approximately the same time. Object detection performed on the camera data is completed before object detection performed on the radar data is completed, such that the regions 210, 220, and 230 can be object information determined from the camera data captured at approximately the same time as the radar data. In contrast, diagram 250 includes points generated using a detection threshold that is adjusted based on the object information indicated by regions 260, 270, and 280. For example, the adjusted detection threshold can be equal to the constant detection threshold within each range bin used to generate diagram 200 for the areas of the point cloud outside of the regions 260, 270, and 280, and within the regions 260, 270, and 280, the adjusted detection threshold can be reduced based on the probability that an object is at the particular point. As a result of the lower adjusted detection threshold in the regions 260, 270, and 280, a number of additional points are detected—two additional points in region 260, three additional points in region 270, and six additional points in region 280.

The adjusted detection threshold used to generate diagram 250 can be used to identify extended objects better than the fixed detection threshold of diagram 200. That is, the adjusted detection threshold can be used to identify an object that occupies more than a single range or velocity bin more effectively than the fixed detection threshold. For the example in which the radar system 100 is included on a vehicle as part of an automated driving assistance system, the adjusted detection threshold can be used to identify a long vehicle such as a semi-truck that occupies multiple range bins. Extended objects result in signal from the radar reflections across multiple bins, which conventional techniques can interpret as an increased noise floor and thus increase the detection threshold. In contrast, the disclosed techniques for an adjusted detection threshold leverage the object information indicated by regions 260, 270, and 280 to more accurately resolve object detections.

Figure 3:
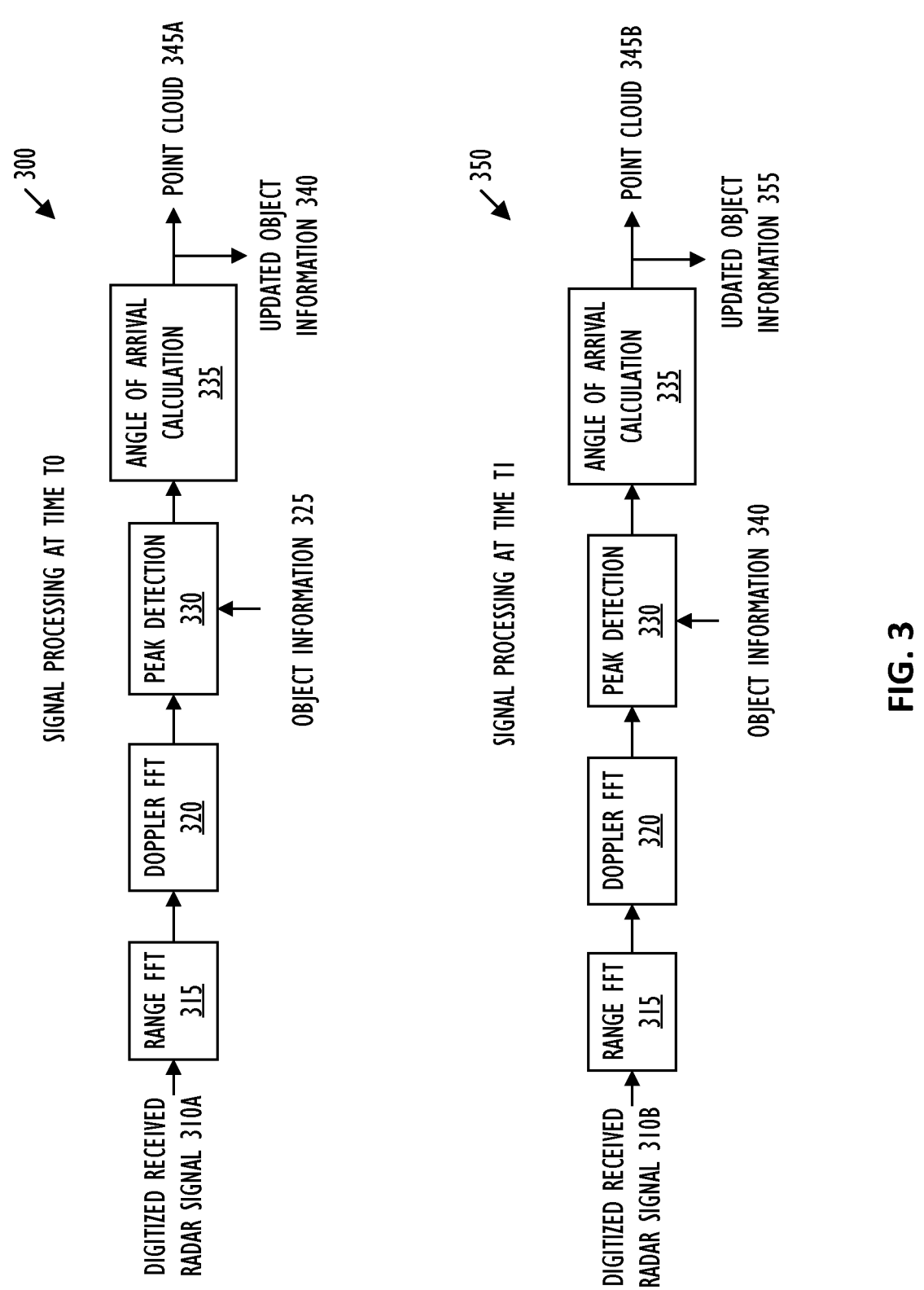
FIG. 3 shows diagrams illustrating an example data processing flow for generating a point cloud based on object information, according to one embodiment.

FIG. 3 shows diagrams 300 and 350 illustrating an example data processing flow for generating a point cloud based on prior tracked object information, according to one embodiment. For ease of illustration, the diagrams 300 and 350 are described herein with respect to the radar system 100 shown in FIG. 1. Diagram 300 shows a signal processing flow at a first time to for a digitized received radar signal 310A. The signal processor 175 performs a range FFT 315 on the digitized received radar signal 310A, then the signal processor 175 performs a Doppler FFT 320 on the output of the range FFT 315. The signal processor 175 then performs peak detection 330 based on object information 325. The object information 325 can include the number, if any, of objects in the environment and dynamic state information for the objects, as described previously herein with respect to FIG. 1. The object information 325 can include information indicative of at least the positions and the velocities of previously identified objects in the environment. For example, the object information 325 can include the positions $(p_x, p_y)$ and the velocities $(v_x, v_y)$ in Cartesian coordinates of previously identified objects in the environment. In some implementations, the object information 325 can include additional information about the previously identified objects, such as the heights $p_z$. The object information can be from the radar system 100, an imaging system, a LIDAR system, and the like, or any combination thereof.

To perform peak detection 330, the signal processor 175 can use the object information 325 to determine an adapted threshold that is equal to a default threshold value for range-Doppler bins that are outside tracked object regions indicated by the object information 325 and a lower, adapted threshold value inside the tracked object regions indicated by the object information 325. After performing peak detection 330, the signal processor 175 can perform angle of arrival calculations 335 to determine the azimuth and/or elevation of detected objects in the environment. The output of the angle of arrival calculations 335 is a point cloud 345A that can include information about the range, Doppler, azimuth, and elevation of detected points associated with the time to. The point cloud 345A can be used to generate updated object information 340. That is, the signal processor 175 or an object tracker updates the object information 325 to include object information associated with the radar data at time to.

Diagram 350 is substantially similar to the diagram 300, and shows a signal processing flow at a second, subsequent time t1 for a digitized received radar signal 310B. The signal processor 175 performs the range FFT 315 and the Doppler FFT 320, then performs peak detection 330 based on the updated object information 340 that includes the object information associated with the time to. To perform peak detection 330, the signal processor 175 can use the object information 340 to determine an adapted threshold that is equal to a default threshold value for range-Doppler bins that are outside tracked object regions indicated by the object information 340 and a lower, adapted threshold value inside the tracked object regions indicated by the object information 340.

After performing peak detection 330, the signal processor 175 can perform angle of arrival calculations 335 to determine the azimuth and/or elevation of detected objects in the environment. The output of the angle of arrival calculations 335 is a point cloud 345B that can include information about the range, Doppler, azimuth, and elevation of detected points associated with time t1. The point cloud 345B can be used to generate updated object information 355. That is, the signal processor 175 or an object tracker updates the object information 340 to include object information associated with the radar data at time t1.

Figure 4:
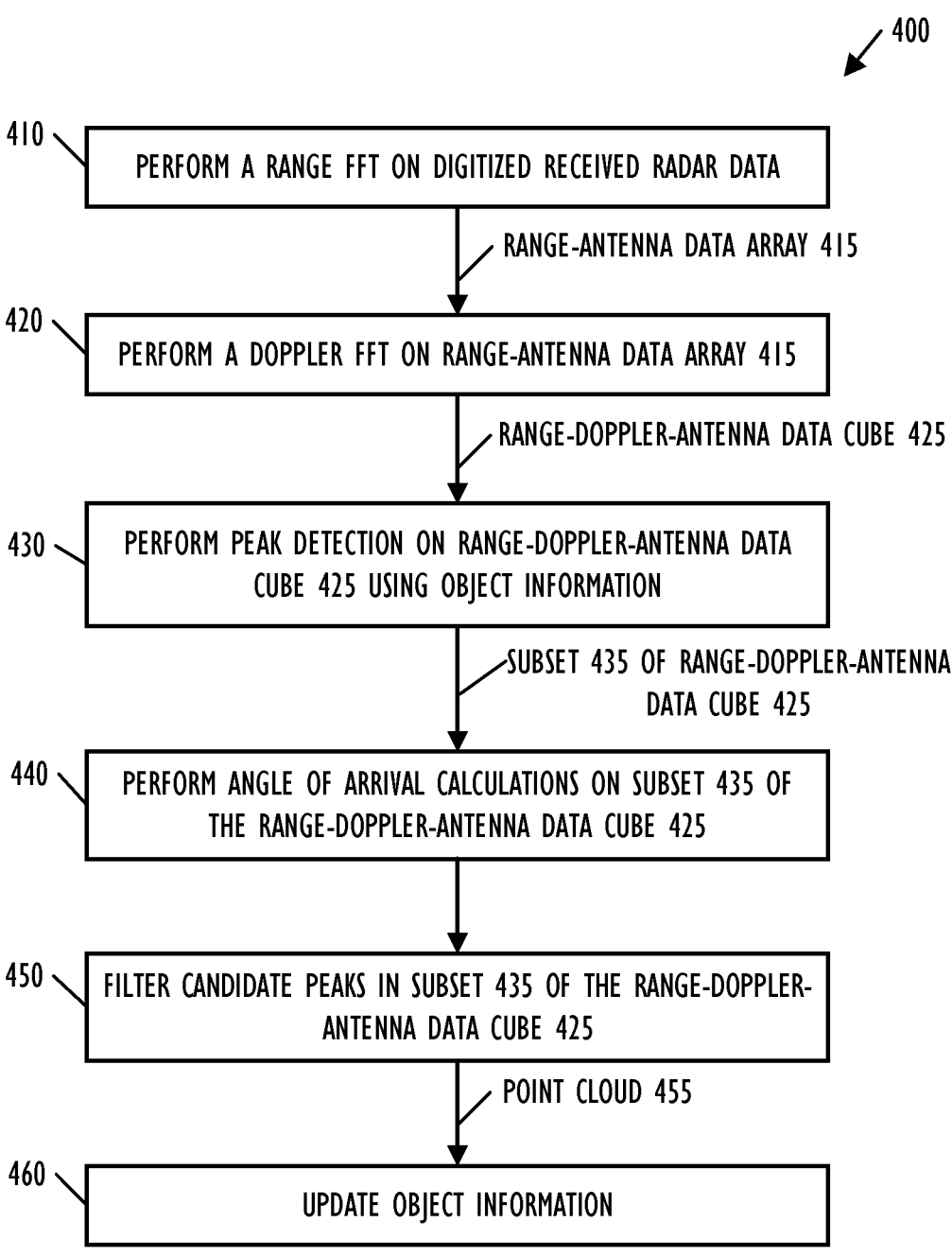
FIG. 4 shows, in flow chart form, an example process for generating a point cloud based on object information, according to one embodiment.

FIG. 4 shows, in flow chart form, an example process 400 for generating a point cloud based on object information, according to one embodiment. For ease of illustration, the process 400 is described herein with reference to the radar system 100 shown in FIG. 1 and the diagram 250 shown in FIG. 2. The process 400 is described herein as being performed by the signal processor 175 in the MCPU 110 executing instructions stored in storage 185 of the radar system 100, but can be performed by any appropriate processing unit executing instructions stored in any appropriate non-transitory computer-readable medium. The steps of process 400 are shown in a particular order in FIG. 4, but the steps of process 400 may be performed in a different order and/or some steps may be performed simultaneously. One or more steps of process 400 can be optional, and process 400 can include additional steps.

The process begins at step 410, at which signal processor 175 performs a range FFT on digitized received radar data to obtain a range-antenna data array 415. At step 420, the signal processor 175 performs a Doppler FFT on the range-antenna data array 415 to obtain a range-Doppler-antenna data cube 425. At step 430, the signal processor 175 performs peak detection on the range-Doppler-antenna data cube 425 using object information. For example, the signal processor 175 can obtain object information from the object tracker 180 included in the radar system 100, from storage 185, or from an object tracker or storage not included in the radar system 100 via interface 190. Performing peak detection using object information is described further herein with respect to FIG. 5. The output of the peak detection is a subset 435 of the range-Doppler-antenna data cube 425 that includes "confirmed peaks"—peaks detected outside the tracked object regions 260, 270, and 280 shown in diagram 250 using the default threshold value—and "candidate peaks"—peaks detected inside the tracked object regions 260, 270, and 280 using the lower, adapted threshold value.

The signal processor 175 performs angle of arrival calculations on the subset 435 of the range-Doppler-antenna data cube 425 at step 440 to determine the azimuth and/or elevation of the confirmed and candidate peaks in the subset 435. The signal processor 175 filters candidate peaks in subset 435 of the range-Doppler-antenna data cube 425 at step 450. In some implementations, the signal processor 175 filters candidate peaks based on the corresponding signal-to-noise ratios (SNRs), ranges, Doppler, azimuth, elevation, or a combination thereof. Although in process 400 the filtering step 450 is shown as being performed after the angle of arrival calculations step 440, the filtering step 450 can be performed at other places in process 400.

For example, the candidate peaks are filtered based on SNR and azimuth. The signal processor 175 can perform a first filtering step 450A after the peak detection step 430 to filter candidate peaks based on SNR. The angle of arrival calculation step 440 can then be performed on fewer candidate peaks, reducing the computational cost of step 440. A second filtering step 450B can be performed after the angle of arrival calculation step 440 to filter candidate peaks based on the determined azimuths. The result of the filtering step 450B after the angle of arrival calculation step 440 is the point cloud 455, which can be provided to an automated driving assistance system, for example. The signal processor 175 then updates the object information at step 460 based on the point cloud 455.

FIG. 5 shows, in flow chart form, an example process 500 for performing peak detection using object information, according to one embodiment. For example, the process 500 can be used to implement the peak detection step 430 of process 400 shown in FIG. 4. For ease of illustration, the process 500 is described herein with reference to the radar system 100 shown in FIG. 1 and the diagrams 600, 630, and 650 shown in FIG. 6. The process 500 is described herein as being performed by the signal processor 175 in the MCPU 110 executing instructions stored in storage 185 of the radar system 100, but can be performed by any appropriate processing unit executing instructions stored in any appropriate non-transitory computer-readable medium. The steps of process 500 are shown in a particular order in FIG. 5, but the steps of process 500 may be performed in a different order and/or some steps may be performed simultaneously. One or more steps of process 500 can be optional, and process 500 can include additional steps.

The process begins at step 510, at which signal processor 175 preprocesses the object information. Step 510 includes an optional step 520 and steps 530 and 540. At optional step 520, the signal processor 175 converts the object information into radar coordinates representative of the range R, Doppler D, and azimuth θ. For example, the object information is presented in Cartesian coordinates and includes position and velocity information for each object included in the object information. That is, the object information includes state information $x_{cart}$ for each object. The state information $x_{cart}$ for a particular object in Cartesian coordinates can be represented as:

$$x_{cart} \triangleq \begin{bmatrix} p_x \\ p_y \\ v_x \\ v_y \end{bmatrix}$$

where $(p_x, p_y)$ represents the position of the particular object in Cartesian coordinates and $(v_x, v_y)$ represents the velocity of the particular object in Cartesian coordinates.

Due to the probabilistic nature of estimation theory, the state information $x_{cart}$ for a particular object is represented by a probability distribution p(x) in the object information. Some object information can use a Gaussian distribution, such that the probability distribution p(x) can be represented as:

$$p(x_{cart}) = \mathcal{N}(x_{cart} \mid \mu_{cart}, P_{cart})$$

where $\mathcal{N}(x_{cart} | \mu_{cart}, P_{cart})$ represents a Gaussian probability density function with a mean parameter $\mu_{cart} \triangleq E[x]$ and the covariance matrix $P_{cart}$ is represented as $P_{cart} \triangleq E[(x-\mu)(x-\mu)^T]$. $E[\cdot]$ represents the expectation operator. Although a Gaussian distribution is used herein, any appropriate probability distribution can be used.

The state information $x_{radar}$ for a particular object in radar coordinates can be represented as:

$$x_{radar} \triangleq \begin{bmatrix} r \\ d \\ \theta \end{bmatrix} = \begin{bmatrix} \sqrt{p_x^2 + p_y^2} \\ \dfrac{(p_x v_x + p_y v_y)}{\sqrt{p_x^2 + p_y^2}} \\ \tan^{-1}\left(\dfrac{p_y}{p_x}\right) \end{bmatrix}$$

The nonlinear mapping between Cartesian coordinates and radar coordinates is represented as $x_{radar}=h(x_{cart})$.

To convert the state estimate $p(x_{cart})$ of a particular object in the object information from Cartesian coordinates into a state estimate $p(x_{radar})$ in radar coordinates (R, D, θ) at optional step 520, the signal processor 175 performs the following transforms:

$$\mu_{radar} = h(\mu_{cart})$$

$$P_{radar} \approx HP_{radar}H^T + N,$$

$$N \triangleq \begin{bmatrix} \sigma_r^2 & 0 & 0 \\ 0 & \sigma_d^2 & 0 \\ 0 & 0 & \sigma_\theta^2 \end{bmatrix}$$

where H is the Jacobian matrix of the nonlinear transform $h(\mu_{cart})$, N is the sensor covariance matrix representative of the measurement noise of the radar system 100, $$\sigma_r^2$$

represents the noise variance for the range measurement, $$\sigma_d^2$$

represents the noise variance for the Doppler measurement, and $$\sigma_\theta^2$$

represents the noise variance for the azimuth measurement. Thus, the uncertainty of the state estimate $p(x_{cart})$ of the object in Cartesian coordinates is propagated to the state estimate $p(x_{radar})$ of the object in radar coordinates by the linear approximation of $h(\bullet)$ around the point $\mu_{cart}$, and the measurement noise is considered. In this example, the mean and uncertainties refer to a center of the tracked object. In some implementations, the extent of the object is also estimated, such that the uncertainty of the state estimate p(x) also captures the extent of the object. That is, the uncertainty of the state estimate p(x) can also represent the uncertainty regarding the number of range bins the object occupies. Optional step 520 can be omitted for object information already in radar coordinates.

At step 530, the signal processor 175 identifies the indices (Ir, Id) of range-Doppler bins corresponding to the radar coordinates (R, D, θ). That is, for each object included in the object information, the signal processor 175 identifies the range bin index Ir and the Doppler bin index Id corresponding to the determined radar coordinates of the object. At step 540, the signal processor 175 identifies regions around the indices (Ir, Id) to determine object areas. For example, the signal processor 175 determines regions 260, 270, and 280 in the diagram 250. In some implementations, the number $n_r$ of range bins and the number $n_d$ of Doppler bins around the indices (Ir, Id) can be chosen based on the covariance matrix $P_{radar}$. For example, the number $n_r$ of range bins and the number $n_d$ of Doppler bins are determined by dividing the square root of the first diagonal element of the covariance matrix $P_{radar}$ by the range resolution of the radar system 100 and dividing the square root of the second diagonal element of the covariance matrix $P_{radar}$ by the Doppler resolution of the radar system 100. In some implementations, the number $n_r$ of range bins can be a fixed value, to reduce the computational complexity. For example, the number $n_r$ of range bins can set equal to five, such that the tracked object areas include range bins having the indices [$i_r-2$, $i_r-1$, $i_r$, $i_r+1$, $i_r+2$].

At step 550, the signal processor 175 calculates an adapted detection threshold. Step 550 includes step 560 and 570. At step 560, the signal processor 175 determines an object probability density for each range-Doppler bin in the object areas. The object probability density in a particular range gate in the object areas can be approximated as $p_{object}(d) = \mathcal{N}(d|\mu_d, \sigma_{doppler}^2)$, where $\mu_d$ is the second element of $P_{radar}$ and $$\sigma_{doppler}^2$$

is the second diagonal element of $P_{radar}$ and where the spread of the probability distribution along the range axis is ignored. The signal processor 175 can then calculate the bin probabilities $Pr_{object}[j]$ of the object using the object probability density $P_{object}(d)$ as:

$$Pr_{object}[j] = \int_{B_{i,l}}^{B_{i,u}} p_{object}(\tau)d\tau$$

where j represents the Doppler bin j and $B_{i,l}$ and $B_{i,u}$ represent the lower and upper terminal values of the $j^{th}$ Doppler bin, respectively. The bin probabilities $Pr_{object}[j]$ are the probabilities that the center of an object is in the particular Doppler bin j and can be calculated using a cumulative distribution function of the Gaussian distribution or other numerical approximations.

To account for noise in the radar signal, a uniform noise distribution is used, such that a noise bin probability $Pr_{noise}[j]$ is constant across the Doppler bins. That is, the noise bin probability $Pr_{noise}[j]$ can be represented as:

$$Pr_{noise}[j] = \frac{1}{n_{doppler}}$$

Thus, the total probability distribution $Pr_{total}[j]$ of a reflection is represented as:

$$Pr_{total}[j] = w_{noise}Pr_{noise}[j] + \sum_{m=1}^{M} w_{object}^m Pr_{object}^m[j]$$

where $w_{noise}$ is a weight associated with the noise distribution, a number M of objects are included in the object information, and $$w_{object}^m$$

is a weight associated with the object distribution of a particular object m. The weights $w_{noise}$ and $$w_{object}^m$$

are nonnegative and sum to one. The particular values of the weights $w_{noise}$ and $$w_{object}^m$$

can be chosen based on the particular implementation. For example, $w_{noise}$ and the sum of $$w_{object}^m$$

can be set equal to fixed values, and the fixed value for the sum of $w_{object}^m$ is divided equally between the weights $$w_{object}^m$$

of the M objects in the object information, such that the likelihood of each object is the same. In other implementations, the fixed value for the sum of $$w_{object}^m$$

can be divided between the weights $$w_{object}^m$$

of the M objects in the object information to reflect the relative existence probability of the objects, such that objects with a higher confidence in existence based on prior measurements are weighted more heavily than objects with a lower confidence in existence. In some implementations, the weights $w_{noise}$ and $w_{object}$ can be calculated adaptively, for example based on the existence probability of a particular object, the SNR of a particular object, and the like. For example, an object with a greater than 50% existence probability can result in $w_{object}$ being greater than $w_{noise}$, while an object with a less than 50% existence probability can result in $w_{object}$ being less than $w_{noise}$.

Figure 6:
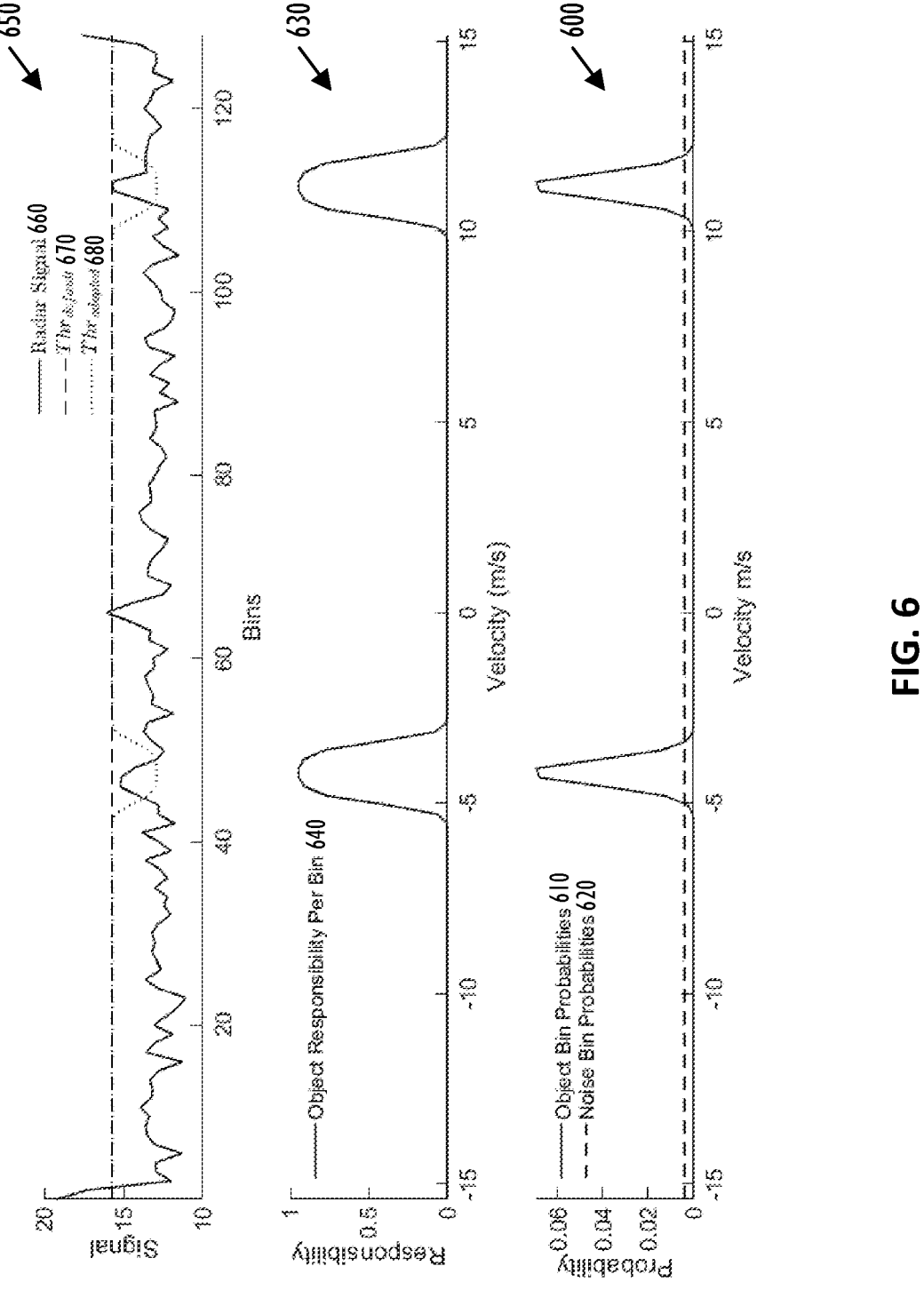
FIG. 6 shows diagrams of object and noise probabilities, object responsibility, and the adapted detection threshold, according to one embodiment.

To illustrate the relative contributions of noise and radar reflections in the signal, diagram 600 shown in FIG. 6 represents the object bin probabilities $Pr_{object}[j]$ 610 and the noise bin probabilities $Pr_{noise}[j]$ 620 over velocity. In diagram 600, the radar system 100 implements a Doppler-division multiplexing scheme, with the result that a single object is represented at two velocities—in this example, at approximately negative four meters per second (m/s) and at approximately eleven m/s—which are disambiguated by a Doppler disambiguation process. A negative velocity is indicative of an object moving towards the radar system 100, and a positive velocity is indicative of an object moving away from the radar system 100. The noise bin probabilities $Pr_{noise}[j]$ 620 are constant across velocity to reflect the uniform noise distribution. The object bin probabilities $Pr_{object}[j]$ 610 include peaks at approximately negative four m/s and at approximately eleven m/s, which indicates that the contribution of a radar reflection off the object to the radar signal is much greater than the noise contribution at those velocities.

The object responsibility per bin $R_{[object]}[j]$ is a ratio of the contribution of the object bin probability $Pr_{object}[j]$ to the total probability distribution $Pr_{total}[j]$ divided by the probability of the combination. That is, the object responsibility per bin $R_{[object]}[j]$ can be represented as:

$$R_{[object]}[j] = \frac{w_{object}Pr_{object}[j]}{Pr_{total}[j]} = 1 - \frac{w_{noise}Pr_{noise}[j]}{Pr_{total}[j]}$$

Each value of the object responsibility per bin $R_{[object]}[j]$ shows the contribution of the radar reflections off the tracked object to the total measured radar signal at a particular Doppler bin j. The object responsibility per bin $R_{[object]}[j]$ can be a number between 0 and 1, such that multiplying by 100 gives the percentage-wise contribution of the radar reflections off the tracked object to the total measured radar signal at a particular Doppler bin j. The diagram 630 shown in FIG. 6 shows the object responsibility per bin $R_{[object]}[j]$ 640 for the object bin probabilities $Pr_{object}[j]$ 610 and the noise bin probabilities $Pr_{noise}[j]$ 620 in diagram 600. That is, the contribution of the object bin probabilities $Pr_{object}[j]$ 610 relative to the contribution of the noise bin $Pr_{noise}[j]$ 620 to the total probability distribution $Pr_{total}[j]$ is much higher at the velocities approximately negative four m/s and at approximately eleven m/s than at other velocities.

At step 570, the signal processor 175 adjusts a default detection threshold for each range-Doppler bin in the tracked object areas based on the corresponding object responsibility. The default detection threshold value $Thr_{default}$ can be lowered by an amount based on the contribution from an object to that particular Doppler bin. For example, the adapted detection threshold $Thr_{adapted}[j]$ can be represented as:

$$Thr_{adapted}[j]=Thr_{default}[j]-\alpha^*R_{[object]}[j]$$

where $\alpha$ represents a maximum permissible decrease in the detection threshold. The maximum permissible decrease a can be chosen based on an SNR characteristic of the radar system 100, an application-specific balance between false alarms and the probability of detection, and the like. Diagram 650 shown in FIG. 6 illustrates the radar signal 660, the default detection threshold value $Thr_{default}$ 670, and the adapted detection threshold $Thr_{adapted}$ 680. At velocities outside of the object areas, the default detection threshold value $Thr_{default}$ 670 and the a value of the adapted detection threshold $Thr_{adapted}$ 680 are equal. At velocities within the object areas, the adapted detection threshold $Thr_{adapted}$ 680 has a lower value than the default detection threshold value $Thr_{default}$ 670 based on the object responsibility per bin $R_{[object]}[j]$ 640 shown in diagram 630. For example at a velocity of approximately negative five m/s, the value of the adapted detection threshold $Thr_{adapted}$ 680 is slightly lower than the default detection threshold value $Thr_{default}$ 670, and at a velocity of approximately negative four m/s, the value of the adapted detection threshold $Thr_{adapted}$ 680 is much lower than the default detection threshold value $Thr_{default}$ 670. The greater difference between the default detection threshold value $Thr_{default}$ 670 and the value of the adapted detection threshold $Thr_{adapted}$ 680 at negative four m/s relative to negative five m/s reflects the greater object responsibility per bin $R_{[object]}[j]$ 640 at negative four m/s compared to negative five m/s.

At step 580, the signal processor 175 identifies confirmed peaks and candidate peaks in the range-Doppler-antenna data cube 425 using the adapted detection threshold calculated at step 550. For ease of explanation, confirmed peaks are peaks detected outside the object areas in which the adapted detection threshold has a value equal to the default detection threshold. Candidate peaks are peaks detected within the object areas in which the adapted detection threshold has a value less than the default detection threshold. For example in diagram 250 shown in FIG. 2, the points detected with adjusted detection threshold are considered candidate peaks, while the points detected with a constant detection threshold are considered confirmed peaks. Candidate peaks can be filtered at step 450 of process 400 as described previously herein, to prevent the introduction of false positives into the point cloud 455. At step 590, the signal processor 175 includes the confirmed peaks and the candidate peaks in the subset 435 of the range-Doppler-antenna data cube 425.

Figure 7:
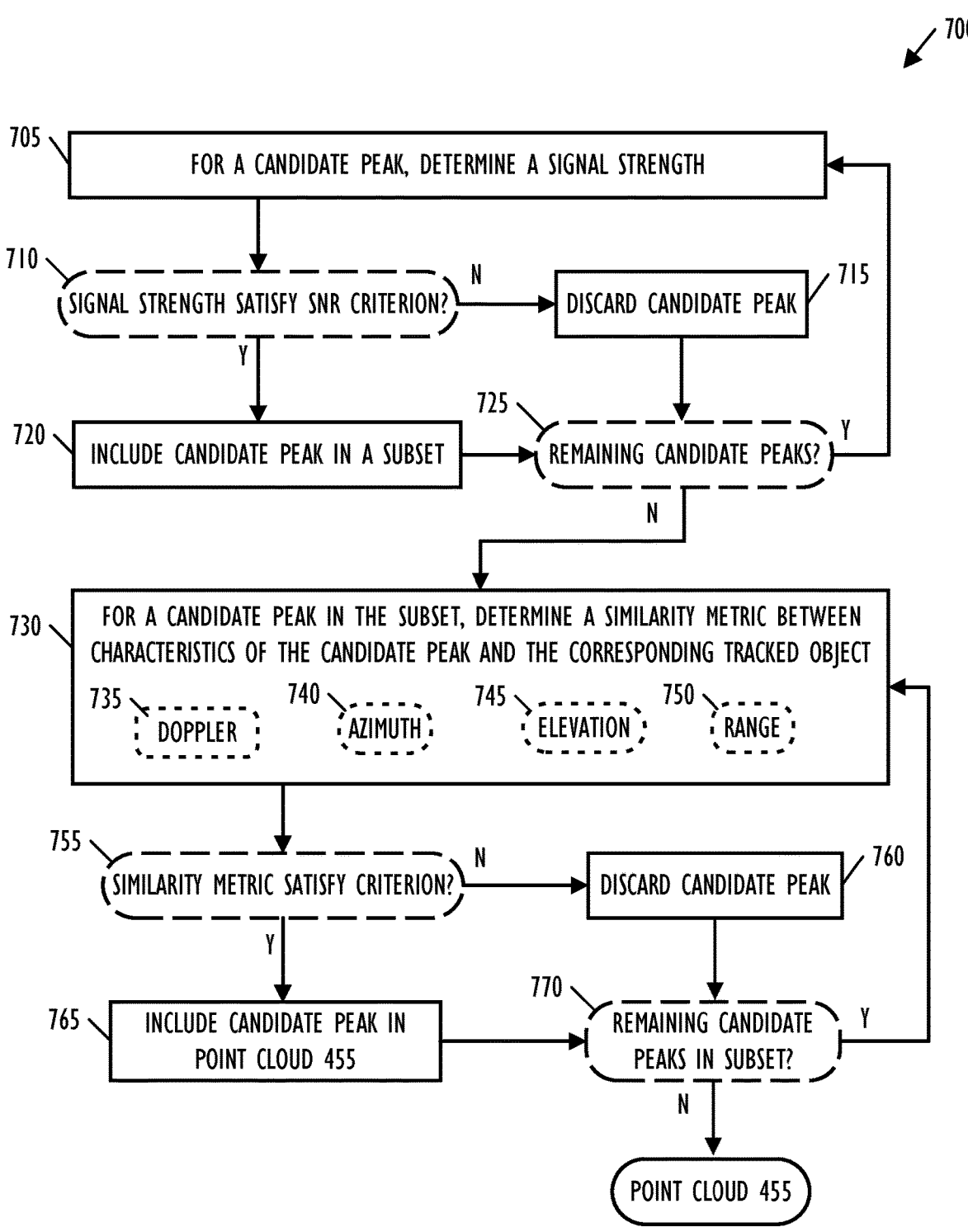
FIG. 7 shows, in flow chart form, an example process for filtering candidate peaks, according to one embodiment.

FIG. 7 shows, in flow chart form, an example process 700 for filtering candidate peaks, according to one embodiment. For example, the process 700 can be used to implement the candidate peak filtering step 450 of process 400 shown in FIG. 4. For ease of illustration, the process 700 is described herein with reference to the radar system 100 shown in FIG. 1. The process 700 is described herein as being performed by the signal processor 175 in the MCPU 110 executing instructions stored in storage 185 of the radar system 100, but can be performed by any appropriate processing unit executing instructions stored in any appropriate non-transitory computer-readable medium. The steps of process 700 are shown in a particular order in FIG. 7, but the steps of process 700 may be performed in a different order and/or some steps may be performed simultaneously. One or more steps of process 700 can be optional, and process 700 can include additional steps.

The process begins at step 705, at which signal processor 175 determines a signal strength for a candidate peak. At step 710, the signal processor 175 determines whether the determined signal strength satisfies a SNR criterion. The SNR criterion can be a minimum SNR such that the signal processor 175 determines whether the determined signal strength is greater than the minimum SNR. In response to determining that the signal strength does not satisfy the SNR criterion, the signal processor 175 discards the candidate peak at step 715. That is, the candidate peak is not sufficiently distinct from noise in the radar signal, and would introduce clutter if included in the point cloud 455. In response to determining that the signal strength satisfies the SNR criterion, the signal processor 175 includes the candidate peak in a subset at step 720. The signal processor 175 then determines whether there are any remaining candidate peaks at step 725. In response to determining that there are remaining candidate peaks, the signal processor 175 returns to step 705 to analyze the next candidate peak.

In response to determining that no candidate peaks remain, the signal processor 175 proceeds to step 730 and determines a similarity metric between characteristics of the candidate peak and the corresponding tracked object in the prior tracked object information. For example, the signal processor 175 can determine an L1 norm between the value of a characteristic of the candidate peak and the value of the characteristic of the corresponding tracked object. The characteristic of the candidate peak and the corresponding tracked object can be a Doppler value 735, an azimuth 740, an elevation 745, and a range 750. In some implementations, the signal processor 175 determines similarity metrics between more than one characteristic. For example, the signal processor 175 determines a first similarity metric for the Doppler value 735 and a second similarity metric for the azimuth 740. In some implementations, the radar system 100 has a low accuracy and/or resolution for the elevation 745, such that the elevation 745 is not a useful characteristic on which to filter the candidate peaks and the signal processor 175 omits the elevation 745 from consideration. The range 750 is already similar between the candidate peak and the corresponding tracked object because the candidate peak is determined from the reduced detection threshold in the tracked object areas. In some implementations, the signal processor 175 omits the range 750 from consideration to reduce the computational complexity.

At step 755, the signal processor 175 determines whether the one or more similarity metrics satisfy a criterion, such as a maximum difference between the characteristic of the candidate peak and the corresponding tracked object. In response to the similarity metric not satisfying the criterion—for example, in response to the characteristic of the candidate peak and the corresponding tracked object exceeding the maximum difference—the signal processor 175 discards the candidate peak at step 760. In response to the similarity metric satisfying the criterion—for example, in response to the characteristic of the candidate peak and the corresponding tracked object being within the maximum difference—the signal processor 175 includes the candidate peak in the point cloud 455 at step 765. The signal processor 175 then determines whether there are any remaining candidate peaks in the subset at step 770. In response to determining that there are remaining candidate peaks, the signal processor 175 returns to step 730 to analyze the next candidate peak. In response to determining that there are no remaining candidate peaks in the subset, the signal processor 175 outputs the point cloud 455.

As described previously herein with respect to the step 450 in process 400 shown in FIG. 4, the steps of filtering process 700 can be interspersed among the steps of process 400 to reduce the number of candidate peaks for which the steps of process 400 are completed. For example, steps 705-725 can be performed immediately after the candidate peaks are identified at step 430 to filter out candidate peaks based on the corresponding signal strength. Similarly, the steps 730-770 can be performed for the range 750 immediately after the candidate peaks are identified at step 430 to filter out candidate peaks based on the corresponding range. Thus, the number of candidate peaks for which Doppler value is disambiguated and the angle of arrival is calculated is reduced. The steps 730-770 can be performed for the disambiguated Doppler 735 after the Doppler disambiguation process is performed, reducing the number of candidate peaks for which the angle of arrival is calculated.

As described herein, the disclosed techniques for adapting a peak detection threshold based on prior tracked object information reduce the number of false negatives by lowering the detection threshold in regions around tracked objects included in the prior tracked object information, thus increasing the detection sensitivity locally. Strategic filtering of the candidate peaks reduces the number of false positives and clutter introduced into the resulting point cloud by the lower detection threshold. Strategic filtering also reduces the number of candidate peaks for which additional calculations are performed, thereby reducing the computational cost of the additional peaks identified by the lower detection threshold. In addition, the adapted detection threshold enables the resulting point cloud to better represent extended objects that occupy more than a single range bin.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A system includes at least one processor and at least one non-transitory computer-readable medium storing machine instructions. The machine instructions, when executed by the at least one processor, cause the processor to perform a first FFT on received radar data to obtain a range-antenna data array and to perform a second FFT on the range-antenna data array to obtain a range-Doppler-antenna data cube. The processor performs peak detection on the range-Doppler-antenna data cube based on object information to obtain a subset of the range-Doppler-antenna data cube. The subset of the range-Doppler-antenna data cube includes confirmed peaks and candidate peaks. The processor performs angle of arrival calculations for the subset of the range-Doppler-antenna data cube and filters candidate peaks in the subset of the range-Doppler-antenna data cube to obtain a point cloud representative of an environment.

In some implementations, the confirmed peaks are detected based on a default threshold value, and the candidate peaks are detected based on at least one adapted threshold value. The at least one adapted threshold value is determined based on the object information. In some implementations, the machine instructions to perform peak detection on the range-Doppler-antenna data cube include machine instructions to preprocess the object information to identify at least one object area and calculate an adapted detection threshold. The adapted detection threshold is equal to the default threshold value outside the at least one object area and equal to the at least one adapted threshold value within the at least one object area. The processor then identifies confirmed and candidate peaks in the range-Doppler-antenna data cube using the adapted detection threshold.

In some implementations, the machine instructions to preprocess the object information include machine instructions to, for each tracked object in the object information, convert an object location into radar coordinates and identify indices of range-Doppler bins corresponding to the radar coordinates. The processor then determines regions around the identified indices to obtain the at least one object area. In some implementations, the machine instructions to calculate the adapted detection threshold include machine instructions to, for each range-Doppler bin in the at least one object area, determine an object responsibility and adjust the default threshold value based on the corresponding object responsibility to obtain the adapted threshold value.

In some implementations, the machine instructions to filter candidate peaks include machine instructions to, for each candidate peak, determine a signal strength of the candidate peak and determine whether the signal strength satisfies a first criterion. In response to the signal strength not satisfying the first criterion, the processor discards the candidate peak. In response to the signal strength satisfying the first criterion, the processor includes the candidate peak in a subset. The machine instructions to filter candidate peaks further include machine instructions to, for each candidate peak in the subset, determine a similarity metric between a characteristic of the candidate peak and a corresponding characteristic of a corresponding tracked object in the object information and determine whether the similarity metric satisfies a second criterion. In response to the similarity metric not satisfying the second criterion, the processor discards the candidate peak. In response to the similarity metric satisfying the second criterion, the processor includes the candidate peak in the point cloud. In some implementations, the characteristic of the candidate peak and the corresponding characteristic of the corresponding tracked object in the object information includes at least one of a range, a velocity, an azimuth, and an elevation.

A non-transitory computer-readable medium stores machine instructions which, when executed by at least one processor, cause the processor to perform a first FFT on received radar data to obtain a range-antenna data array and to perform a second FFT on the range-antenna data array to obtain a range-Doppler-antenna data cube. The machine instructions cause the processor to perform peak detection on the range-Doppler-antenna data cube based on object information to obtain a subset of the range-Doppler-antenna data cube. The subset of the range-Doppler-antenna data cube includes confirmed peaks and candidate peaks. The machine instructions cause the processor to perform angle of arrival calculations for the subset of the range-Doppler-antenna data cube and filter candidate peaks in the subset of the range-Doppler-antenna data cube to obtain a point cloud representative of an environment.

In some implementations, the confirmed peaks are detected based on a default threshold value, and the candidate peaks are detected based on at least one adapted threshold value. The at least one adapted threshold value is determined based on the object information. In some implementations, the machine instructions to perform peak detection on the range-Doppler-antenna data cube include machine instructions to preprocess the object information to identify at least one object area and calculate an adapted detection threshold. The adapted detection threshold is equal to the default threshold value outside the at least one object area and equal to the at least one adapted threshold value within the at least one object area. The machine instructions then cause the processor to identify confirmed and candidate peaks in the range-Doppler-antenna data cube using the adapted detection threshold.

In some implementations, the machine instructions to preprocess the object information include machine instructions to, for each tracked object in the object information, convert an object location into radar coordinates and identify indices of range-Doppler bins corresponding to the radar coordinates. The machine instructions cause the processor to determine regions around the identified indices to obtain the at least one object area. In some implementations, the machine instructions to calculate the adapted detection threshold include machine instructions to, for each range-Doppler bin in the at least one object area, determine an object responsibility and adjust the default threshold value based on the corresponding object responsibility to obtain the adapted threshold value.

In some implementations, the machine instructions to filter candidate peaks include machine instructions to, for each candidate peak, determine a signal strength of the candidate peak and determine whether the signal strength satisfies a first criterion. In response to the signal strength not satisfying the first criterion, the machine instructions cause the processor to discard the candidate peak. In response to the signal strength satisfying the first criterion, the machine instructions cause the processor to include the candidate peak in a subset. The machine instructions to filter candidate peaks further include machine instructions to, for each candidate peak in the subset, determine a similarity metric between a characteristic of the candidate peak and a corresponding characteristic of a corresponding tracked object in the object information and determine whether the similarity metric satisfies a second criterion. In response to the similarity metric not satisfying the second criterion, the machine instructions cause the processor to discard the candidate peak. In response to the similarity metric satisfying the second criterion, the machine instructions cause the processor to include the candidate peak in the point cloud. In some implementations, the characteristic of the candidate peak and the corresponding characteristic of the corresponding tracked object in the object information includes at least one of a range, a velocity, an azimuth, and an elevation.

A method includes performing a first FFT on received radar data to obtain a range-antenna data array and performing a second FFT on the range-antenna data array to obtain a range-Doppler-antenna data cube. Peak detection is performed on the range-Doppler-antenna data cube based on object information to obtain a subset of the range-Doppler-antenna data cube. The subset of the range-Doppler-antenna data cube includes confirmed peaks and candidate peaks. Angle of arrival calculations are performed for the subset of the range-Doppler-antenna data cube and candidate peaks in the subset of the range-Doppler-antenna data cube are filtered to obtain a point cloud representative of an environment.

In some implementations, the confirmed peaks are detected based on a default threshold value, and the candidate peaks are detected based on at least one adapted threshold value. The at least one adapted threshold value is determined based on the object information. In some implementations, performing peak detection on the range-Doppler-antenna data cube includes preprocessing the object information to identify at least one object area and calculating an adapted detection threshold. The adapted detection threshold is equal to the default threshold value outside the at least one object area and equal to the at least one adapted threshold value within the at least one object area. Confirmed and candidate peaks in the range-Doppler-antenna data cube are identified using the adapted detection threshold.

In some implementations, preprocessing the object information includes converting, for each tracked object in the object information, an object location into radar coordinates and identifying, for each tracked object in the object information, indices of range-Doppler bins corresponding to the radar coordinates. Regions around the identified indices are determined to obtain the at least one object area. In some implementations, calculating the adapted detection threshold includes determining, for each range-Doppler bin in the at least one object area, an object responsibility and adjusting, for each range-Doppler bin in the at least one object area, the default threshold value based on the corresponding object responsibility to obtain the adapted threshold value.

In some implementations, filtering candidate peaks includes determining, for each candidate peak, a signal strength of the candidate peak and whether the signal strength satisfies a first criterion. In response to the signal strength not satisfying the first criterion, the candidate peak is discarded. In response to the signal strength satisfying the first criterion, the candidate peak is included in a subset. Filtering candidate peaks further includes determining, for each candidate peak in the subset, a similarity metric between a characteristic of the candidate peak and a corresponding characteristic of a corresponding tracked object in the object information and determining whether the similarity metric satisfies a second criterion. In response to the similarity metric not satisfying the second criterion, the candidate peak is discarded. In response to the similarity metric satisfying the second criterion, the candidate peak is included in the point cloud. In some implementations, the characteristic of the candidate peak and the corresponding characteristic of the corresponding tracked object in the object information includes at least one of a range, a velocity, an azimuth, and an elevation.

What is claimed is:

1. A system comprising:
at least one processor; and
at least one non-transitory computer-readable medium storing machine instructions which, when executed by the at least one processor, cause the at least one processor to:
perform a first fast Fourier transform (FFT) on received radar data to obtain a range-antenna data array corresponding to radar reflections from one or more objects;
perform a second FFT on the range-antenna data array to obtain a range-Doppler-antenna data cube;
perform peak detection on the range-Doppler-antenna data cube based on object information to obtain a subset of the range-Doppler-antenna data cube, wherein the subset of the range-Doppler-antenna data cube includes confirmed peaks representing peaks detected in the radar data determined using a default threshold value and candidate peaks representing peaks detected in the radar data using at least one adapted threshold value that is less than the default threshold value;
perform angle of arrival calculations for the subset of the range-Doppler-antenna data cube; and
filter candidate peaks in the subset of the range-Doppler-antenna data cube to obtain a point cloud representative of an environment.

2. The system of claim 1, wherein
the at least one adapted threshold value is determined based on the object information.

3. The system of claim 2, wherein the machine instructions to perform peak detection on the range-Doppler-antenna data cube comprise machine instructions to:
preprocess the object information to identify at least one object area;
calculate the at least one adapted threshold that is lower within each of the one or more tracked object regions based on the received radar data corresponding to an object within the tracked object region, wherein the at least one adapted threshold is equal to the default threshold value outside the at least one object area; and
identify candidate peaks in the range-Doppler-antenna data cube using the at least one adapted threshold.

4. The system of claim 3, wherein the machine instructions to preprocess the object information comprise machine instructions to:
for each tracked object in the object information, convert an object location into radar coordinates;
for each tracked object in the object information, identify indices of range-Doppler bins corresponding to the radar coordinates; and
determine regions around the identified indices to obtain the at least one object area.

5. The system of claim 3, wherein the machine instructions to calculate the adapted detection threshold comprise machine instructions to:
for each range-Doppler bin in the at least one object area, determine an object responsibility; and
for each range-Doppler bin in the at least one object area, adjust the default threshold value based on the corresponding object responsibility to obtain the at least one adapted threshold.

6. The system of claim 1, wherein the machine instructions to filter the candidate peaks comprise machine instructions to:
for each candidate peak:
determine a signal strength of the candidate peak;
determine whether the signal strength satisfies a first criterion;
in response to the signal strength not satisfying the first criterion, discard the candidate peak; and
in response to the signal strength satisfying the first criterion, include the candidate peak in a subset;
for each candidate peak in the subset:
determine a similarity metric between a characteristic of the candidate peak and a corresponding characteristic of a corresponding tracked object in the object information;
determine whether the similarity metric satisfies a second criterion that is different from the first criterion;
in response to the similarity metric not satisfying the second criterion, discard the candidate peak; and
in response to the similarity metric satisfying the second criterion, include the candidate peak in the point cloud.

7. The system of claim 6, wherein the characteristic of the candidate peak and the corresponding characteristic of the corresponding tracked object in the object information includes at least one of a range, a velocity, an azimuth, and an elevation.

8. A non-transitory computer-readable medium storing machine instructions which, when executed by at least one processor, cause the at least one processor to:

perform a first fast Fourier transform (FFT) on received radar data to obtain a range-antenna data array;

perform a second FFT on the range-antenna data array to obtain a range-Doppler-antenna data cube;

perform peak detection on the range-Doppler-antenna data cube based on object information to obtain a subset of the range-Doppler-antenna data cube, wherein the subset of the range-Doppler-antenna data cube includes confirmed peaks representing peaks detected in the radar data determined using a default threshold value and candidate peaks representing peaks detected in the radar data using at least one adapted threshold value that is less than the default threshold value;

perform peak detection on the range-Doppler-antenna data cube based on object information to obtain a subset of the range-Doppler-antenna data cube, wherein the subset of the range-Doppler-antenna data cube includes confirmed peaks and candidate peaks;

perform angle of arrival calculations for the subset of the range-Doppler-antenna data cube; and filter candidate peaks in the subset of the range-Doppler-antenna data cube to obtain a point cloud representative of an environment.

9. The non-transitory computer-readable medium of claim 8, wherein the at least one adapted threshold value is determined based on the object information.

10. The non-transitory computer-readable medium of claim 9, wherein the machine instructions to perform peak detection on the range-Doppler-antenna data cube comprise machine instructions to:

preprocess the object information to identify at least one object area;

calculate the at least one adapted threshold that is lower within each of the one or more tracked object regions based on the received radar data corresponding to an object within the tracked object region, wherein the at least one adapted threshold is equal to the default threshold value outside the at least one object area; and identify candidate peaks in the range-Doppler-antenna data cube using the at least one adapted threshold.

11. The non-transitory computer-readable medium of claim 10, wherein the machine instructions to preprocess the object information comprise machine instructions to:

for each tracked object in the object information, convert an object location into radar coordinates;

for each tracked object in the object information, identify indices of range-Doppler bins corresponding to the radar coordinates; and determine regions around the identified indices to obtain the at least one object area.

12. The non-transitory computer-readable medium of claim 10, wherein the machine instructions to calculate the adapted threshold comprise machine instructions to:

for each range-Doppler bin in the at least one object area, determine an object responsibility; and for each range-Doppler bin in the at least one object area, adjust the default threshold value based on the corresponding object responsibility to obtain the at least one adapted threshold.

13. The non-transitory computer-readable medium of claim 8, wherein the machine instructions to filter candidate peaks comprise machine instructions to:

for each candidate peak:

determine a signal strength of the candidate peak;

determine whether the signal strength satisfies a first criterion;

in response to the signal strength not satisfying the first criterion, discard the candidate peak; and in response to the signal strength satisfying the first criterion, include the candidate peak in a subset;

for each candidate peak in the subset:

determine a similarity metric between a characteristic of the candidate peak and a corresponding characteristic of a corresponding tracked object in the object information;

determine whether the similarity metric satisfies a second criterion that is different from the first criterion;

in response to the similarity metric not satisfying the second criterion, discard the candidate peak; and in response to the similarity metric satisfying the second criterion, include the candidate peak in the point cloud.

14. The non-transitory computer-readable medium of claim 13, wherein the characteristic of the candidate peak and the corresponding characteristic of the corresponding tracked object in the object information includes at least one of a range, a velocity, an azimuth, and an elevation.

15. A method comprising:

performing a first fast Fourier transform (FFT) on received radar data to obtain a range-antenna data array;

performing a second FFT on the range-antenna data array to obtain a range-Doppler-antenna data cube;

performing peak detection on the range-Doppler-antenna data cube based on object information to obtain a subset of the range-Doppler-antenna data cube, wherein the subset of the range-Doppler-antenna data cube includes confirmed peaks representing peaks detected in the radar data determined using a default threshold value and candidate peaks representing peaks detected in the radar data using at least one adapted threshold value that is less than the default threshold value;

performing angle of arrival calculations for the subset of the range-Doppler-antenna data cube; and filtering candidate peaks in the subset of the range-Doppler-antenna data cube to obtain a point cloud representative of an environment.

16. The method of claim 15, wherein the at least one adapted threshold value is determined based on the object information.

17. The method of claim 16, wherein performing peak detection on the range-Doppler-antenna data cube comprises:

preprocessing the object information to identify at least one object area;

calculating the at least one adapted threshold that is lower within each of the one or more tracked object regions based on the received radar data corresponding to an object within the tracked object region, wherein the at least one adapted threshold is equal to the default threshold value outside the at least one object area; and identifying candidate peaks in the range-Doppler-antenna data cube using the at least one adapted threshold.

18. The method of claim 17, wherein preprocessing the object information comprises:

for each tracked object in the object information, converting an object location into radar coordinates;

for each tracked object in the object information, identifying indices of range-Doppler bins corresponding to the radar coordinates; and determining regions around the identified indices to obtain the at least one object area.

19. The method of claim 17, wherein calculating the adapted threshold comprises:

for each range-Doppler bin in the at least one object area, determining an object responsibility; and for each range-Doppler bin in the at least one object area, adjusting the default threshold value based on the corresponding object responsibility to obtain the at least one adapted threshold.

20. The method of claim 15, wherein filtering candidate peaks comprises:

for each candidate peak:

determining a signal strength of the candidate peak;

determining whether the signal strength satisfies a first criterion;

in response to the signal strength not satisfying the first criterion, discarding the candidate peak; and in response to the signal strength satisfying the first criterion, including the candidate peak in a subset;

for each candidate peak in the subset:

determining a similarity metric between a characteristic of the candidate peak and a corresponding characteristic of a corresponding tracked object in the object information;

determining whether the similarity metric satisfies a second criterion that is different from the first criterion;

in response to the similarity metric not satisfying the second criterion, discarding the candidate peak; and in response to the similarity metric satisfying the second criterion, including the candidate peak in the point cloud.

* * * * *